United States Patent Office 3,028,340
Patented Apr. 3, 1962

3,028,340
PRODUCTION OF NEW COMPOSITIONS FROM GLYOXAL AND ALKALI METAL SILICATES
Louis Gandon and René L. Lehmann, Paris, Henri G. L. Marcheguet, Amfreville-la-Mi-Voie, and Francis P. M. Tarbouriech, Paris, France, assignors to Societe Nobel Bozel, Paris, France, a company of France
No Drawing. Filed July 22, 1957, Ser. No. 673,125
Claims priority, application France Dec. 28, 1956
8 Claims. (Cl. 252—313)

It is known to produce cements from aqueous solutions of alkali metal silicates by adding salts of metals other than alkali metals, for example aluminum, zinc, cadmium, iron. Where a concentrated aqueous solution is employed, the mass sets almost immediately to a hard, coherent cement; where, on the contrary a dilute aqueous solution of silicate is employed, an unstable solution which turns to a firm gel may be obtained, but the gel is not as hard as a cement.

It is further known that by partly neutralizing the alkali in an aqueous solution of an alkali metal silicate by means of an acid or another neutralizing or flocculating agent, silica separates either as a flaky precipitate or as a silica gel. In either case, the silica thus set free and left in the medium where it was produced is capable of developing a set mass but the solid mass thus formed lacks cohesiveness and can not be considered as a cement. Such a phenomenon has been found to occur with most various neutralizing or flocculating agents proposed heretofore, including acids, salts, formaldehyde and phenol.

We have now found that starting from an aqueous solution of an alkali metal silicate and causing glyoxal to react therewith, it is possible to produce a strongly agglutinating gel which develops spontaneously a hard, water-insoluble mass showing a high mechanical strength, in the medium where it was produced. Thus a hard siliceous mass having the properties of a cement can be obtained without assistance of an oxide of a metal other than an alkali metal in the reaction process.

The foregoing discovery was quite unexpected because with commonly employed mono-aldehydes nothing similar occurs. Therefore glyoxal, a commercial product which is the first term in the series of aliphatic dialdehydes, produces a specific effect which results in very important advantages as will be set forth below.

In carrying our invention into effect, we may add to an aqueous solution of an alkali silicate for example a solution of sodium silicate having a strength of 36° Bé., an amount of glyoxal corresponding preferably to 5–20 grams of a 30 percent neutral aqueous solution of glyoxal per 100 grams of a 36° Bé. sodium silicate solution, so as to provide a homogeneous solution which after a period of, for example, a few minutes to an hour, yields a gel becoming harder and harder, eventually maturing to a cement found to be completely insoluble in water, for example after 1 to 2 days.

Therefore, in carrying our invention into effect, we may use directly without diluting them previously, commercial aqueous solutions of alkali metal silicates, in which the ratio between the member of molecules of $SiO_2$ and the number of molecules of $Na_2O$ ranges from 3 to 4, for example those having a strength of from 35 to 50° Bé., and commercial neutral aqueous solutions containing not less than 30 percent by weight of glyoxal or even powdery poly-glyoxal. As a matter of fact, we have found that glyoxal is capable of mixing instantaneously and thoroughly with aqueous solutions, even highly concentrated solutions of alkali metal silicates, without any precipitation; it is only subsequently that a gel becoming harder and harder is formed slowly and gradually. Although this invention is not dependent upon any hypothesis or attempt of explanation, we suppose that glyoxal reacts, after some time, slowly and gradually with alkali from the silicate, with consequent formation of a siliceous gel in a very concentrated medium. It is supposed that the production of a siliceous gel in a very concentrated medium by a slow, gradual, chemical action of glyoxal on alkali from the silicate is responsible for the development of a hard mass having cement properties in the reaction medium.

Such a water insoluble cement was found to be produced equally readily where additional ingredients such for example as are incorporated in coating composition, e.g. chalk, kaolin, starches and the like are supplied to the reaction medium.

Where a commercial alkali metal silicate solution, say having a strength of 36° Bé. is employed, the reaction still proceeds satisfactorily if further water is added, say by an amount of 10 percent by weight.

For practical purposes the alkali metal silicate solution with which glyoxal is contacted to suit the purposes of this invention should have a strength not below that of a 36° Bé. solution diluted with 100 percent by weight of water.

The proportion of glyoxal to be added may vary over a wide range; ambient atmospheric temperature is quite suitable in carrying the process into practice; as a matter of fact, temperatures of from 10 to 30° C. are preferred.

By suitably controlling dilution, glyoxal proportion and, as the case may be, temperature, it is however possible to control the rate of setting (production of gel then of cement) with a very high accuracy, even where various additional ingredients are present, for example by effecting a few preliminary experiments.

Setting aside the beneficial, specific effect obtained by employing glyoxal, the use of such a reagent is believed to simplify the production of gels to a high extent if the process according to this invention is compared with those heretofore employed for making silica gels; as a matter of fact such prior processes require very accurate conditions so far as the concentrations, the sequence and the rate of addition of the reagents, the velocity in stirring, the temperature and the proportions are concerned, and also the reagents to be employed need be checked constantly with a view to avoiding difficulties in the manufacture.

We have further found that masses produced as herein described so far are suitable for coating purposes, particularly for coating papers, for coating earth and the like, as cements for example for strengthening sandy or porous soils, or making them water-tight for making founding cores and the like, as adsorbing or absorbing masses, e.g. for fixing liquids, gases or vapours, as filling or reinforcing materials to be introduced for example into a paper making trough or incorporated in rubber latex, as filling or bonding ingredients, for example in bonding or gluing or agglomerating materials.

Where for example an aqueous solution of an alkali metal silicate to which glyoxal has been added as above specified is introduced homogeneously into a sandy soil, a gel is produced within the soil, and a strengthened very hard soil is provided on which buildings may be erected. Permeable soils may be treated likewise with a view to making them capable of supporting buildings, dams, water gates or the like.

If, on the other hand, an aqueous solution of alkali metal silicate to which glyoxal and, possibly, filling material such as chalk have been added is poured over a soil even without a previous preparation of the soil surface the production of a gel results in a very quick setting and provides a coating of a very satisfactory mechanical strength.

The following examples which are not limiting will

Example 1

Into 10 parts of a commercial aqueous solution of sodium silicate having a strength of 36° Bé.

$$(SiO_2:Na_2O=3.4)$$

1 part of a 30 percent commercial neutral aqueous solution of glyoxal was poured. There was obtained a homogeneous solution which after about half an hour left a gel which became harder and harder, eventually acquiring the conspicuous properties of a cement after about 1½ hours; the cement altered in the course of time and became wholly insoluble in water after about two days; during the last stage of formation of said cement, a caustic liquid bled out.

If the starting silicate solution was diluted, for example with 10 percent of water, all other conditions being the same, the rate of setting of the cement was slower but the final properties were substantially the same. If the proportion of water was further increased, the siliceous mass obtained gradually lost the properties of a cement. In practice no more than 100 parts by weight of water per 100 parts of the 36° Bé. silicate solution should be added.

If fillers such as chalk were added to the mixed silicate glyoxal solutions, the rate of setting was not altered but if additional ingredients such as kaolin or potato starch were incorporated, the rate of setting was accelerated to an extent depending on the amount of ingredient added.

Example 2

The present example illustrates the desirability of the process according to this invention for strengthening sandy soils.

To 10 parts of a commercial aqueous solution of sodium silicate having a strength of 36° Bé.

$$(SiO_2/Na_2O=3.4)$$

1 part of a 30 percent commercial neutral aqueous solution of glyoxal was added, and the homogeneous liquid thus obtained was injected into 200 parts of moist sand (15 percent of moisture) so as to form a homogeneous mixture. After about an hour, the mass became hard and tough. It was watched for several months, being exposed to weather conditions (rains and frost); after that period the mass had remained hard and tough, and the mechanical strength thereof had not decreased at all.

Example 3

This example shows how soil coatings can be made.

A paste was made from 32 parts of chalk and 8 parts of water, then 8 parts of a commercial aqueous solution of sodium silicate (36° Bé.) was added thereto, and the mixture worked to give a homogeneous paste; 0.8 part of a 30 percent commercial neutral aqueous solution of glyoxal was then incorporated while homogenizing the mixture. The mixture was then poured on an unprepared soil, within a wood frame. After about 1 hour the mixture set into a hard, tough coating. After several months, the coating which was left exposed to weather (rains and frost) had remained hard and tough; the mechanical strength thereof had not decreased at all.

Example 4

In a Werner mixer, 200 parts of dried resinous wood dust were mixed with a liquid consisting of 200 parts of a commercial aqueous solution of sodium silicate (36° Bé.) and 20 parts of a 30 percent commercial neutral aqueous solution of glyoxal.

The mixture was molded and cold pressed with a pressure of 12–14 kg. per sq. cm. for an hour.

The unmolded mass was a hard, tough wood slab similar to a paving-stone.

Example 5

Into 100 parts of a commercial aqueous solution of sodium silicate (36° Bé.), 6.5 parts of a 30 percent by weight, commercial neutral aqueous solution of glyoxal were poured, and the mixture was left for a day.

A cement block was obtained; it was immersed in a 4–N aqueous solution of sulphuric acid until the mass was thoroughly bleached to the core thereof. The block was then crushed, the fragments were washed with running water for 24 hours, thereafter dried at 105–110° C. and finally reduced to powder for example in a ball mill.

A powdery, very white silica, having a very low apparent density (0.1 in the case of non-rammed powder) and a specific surface of the order of 200 sq. metres per gram corresponding to a grain size of about $0.0001\mu$, was thus obtained.

That extremely fine and homogeneous silica was found to be particularly fit as a reinforcing agent for rubber and similar products.

Example 6

This example shows how a reinforcing filler can be produced within rubber latex.

Into 167 parts of a 60 percent natural rubber latex diluted with 167 parts of water, 120 parts of a commercial aqueous solution of sodium silicate (36° Bé.) were introduced. A homogeneous liquid was obtained, and 25 parts of a 30 percent commercial neutral aqueous solution of glyoxal were added thereto with stirring.

After a few hours, a gel separated which was left to mature for 24 hours. The mixture was made acid with a 5 percent aqueous solution of acetic acid and left for 24 hours.

The rubbery mixture was then in a flocculated condition. It was washed abundantly with water then treated for 1½ hours, in boiling condition, with an aqueous solution of acetic acid having a pH-value of 4. It was washed with water and dried.

For curing, the following ingredients were added to the mixture:

| | Parts |
|---|---|
| Stearic acid | 3 |
| Zinc oxide | 5 |
| Ionol or 2:6 -di-tert. butyl-4-methyl phenol | 1 |
| Zinc mercapto-benzimidazolate | 1 |
| Diphenylguanidine | 1.2 |
| Monoethanolamine | 1 |
| Mercaptobenzthiazole | 1 |
| Sulphur | 3.5 | and the compounded mixture was cured at 140° C. for 30 minutes.

The properties of the vulcanizate were as follows:

| | Vulcanizate | Control (untreated) |
|---|---|---|
| Tensile strength (breaking) kg./sq.cm. | 310 | 310 |
| Modulus at 300%, kg./sq.cm. | 90 | 25 |
| Maximum elongation, percent | 580 | 590 |
| Resistance to tearing, kg./sq.cm. | 92 | 60 |
| Shore hardness | 53 | 40 |

By impregnating fabrics, wood or other materials with an aqueous solution of sodium silicate to which glyoxal has been added according to this invention, a siliceous gel is produced within and on the outer surface of such materials which are thereby rendered water-proof. The water-proofing effect thus secured is desirable because it is resistant to water, by reason of the water-insolubility of the gel. The following example is illustrative.

Example 7

A dry pine wood plank was immersed for 5 minutes in a liquid freshly prepared from 100 parts of a commercial aqueous solution of sodium silicate (36° Bé.) and 15 parts of a 30 percent commercial neutral aqueous solution of glyoxal, then was left to dry. A good fire proofing effect which resists to water was thus obtained.

Owing to their agglutinating property, silicate-glyoxal mixtures according to this invention may be employed at the same time as bonding and fire-proofing agents in the manufacture of various materials such as panels from vegetable fibers for example.

The following example is illustrative:

Example 8

In a mixer, 100 parts of flax fibrous waste were mixed with a liquid freshly prepared from 40 parts of a commercial aqueous solution of sodium silicate (36° Bé.) and 4 parts of a 30 percent commercial neutral aqueous solution of glyoxal. The mixture was then pressed according to a conventional practice into a panel. The panel showed good mechanical properties while being very well fire-proofed.

A frequent problem in industry is to convert residual liquids or freely flowing sludges into solid, hard masses, which can be transported and then easily removed; such a problem is important in the case of radio-active wastes many of which are acid waters.

We have found that waste waters can easily be converted to tough, transportable, readily removable masses by adding thereto a mixture of silicate and glyoxal solutions according to this invention.

The following example is illustrative.

Example 9

Taking a waste nitric water having a nitric acid content corresponding to N2, the nitric water was exactly neutralized with the required amount of sodium carbonate then an aqueous solution of sodium silicate and a neutral aqueous solution of glyoxal were added thereto. Very hard gels which did not exfoliate in the course of time were obtained with the following amounts expressed in terms of parts by volume

| | | |
|---|---|---|
| Neutralized nitric water, parts | 100 | 100 |
| Commercial aqueous solution of sodium silicate (35-37° Bé.), parts | 50 | 100 |
| Commercial neutral aqueous solution of glyoxal (30 percent), parts | 5 or more | 10 or more |

The gels thus obtained were very hard and stable in each case. The setting time depended on the proportion of glyoxal; before the formation of the very hard gel, bleeding which was abundant to unnoticeable according to the proportion of glyoxal, took place as apparent for example from the following table:

| | | | |
|---|---|---|---|
| Nitric water (parts by volume) | 100 | 100 | 100. |
| Aqueous solution of sodium silicate, 35-37° Bé. (parts by volume). | 100 | 100 | 100. |
| 30 percent aqueous neutral solution of glyoxal (parts by volume). | 10 | 20 | 30. |
| Setting period (minutes) | 20 | 5 | 2. |
| Bleeding before obtaining a very hard cement. | Abundant | Slight | Substantially nil. |

It is known that a difficult problem in founding is the manufacture of heavy articles, which requires the use of costly substances such as self-drying oils. The process according to this invention enables of solving the problem very simply, as illustrated by the following example.

Example 10

In a Werner mixer having a content of 100 litres, 45 kg. of founding sand were placed.

A liquid was prepared from 3,150 g. of commercial aqueous solution of sodium silicate (36° Bé.),
315 g. of a 60 percent neutralized, aqueous solution of glyoxal, and was stirred into the sand. Mixing was proceeded with for 2 minutes; a homogenous mixture having a good consistency was obtained; 7.5 kg. thereof were introduced into a moulding box with a pattern therein. The pattern was removed after 20 minutes. There was no adhesion, the mold was immediately very hard and metal could at once be cast therein.

Where a greater plasticity of the mold is desired, for difficult cases, molasses or sugars may be added to the mixture of sand, silicate and glyoxal, for example 300 g. of a 60 percent saccharose syrup per 100 kg. of sand.

If it is desired, the internal walls of the mold may be rendered particularly hard and smooth by coating the same with a "varnish" made, for example, of 100 parts of a sodium silicate aqueous solution (35–37° Bé.) and 20 parts of a 30 percent neutral aqueous solution of glyoxal. In such a case, a "varnish" having a satisfartory hardness was obtained after a setting period of about 30 minutes.

A mold made in the morning for example will be fit for use in the afternoon.

Example 11

A mixture was formed from 100 parts of pyrites ashes and
5 parts of liquid made of 100 parts of a commercial aqueous solution of sodium silicate (36° Bé.) and
10 parts of a 30 percent commercial neutral aqueous solution of glyoxal.

The mixture was agglomerated under a pressure of 7 to 8 kg. per sq. cm. into blocks which were immediately well coherent.

The hardening gel which according to this invention is produced from alkali metal silicates and glyoxal in aqueous medium may be employed as a self-hardening cement in the manufacture of most varied aggregates from divided materials such as sand, kaolin, chalk, metals and so on. Examples have already been given above in particular as to the production of building materials. Further examples of the production of aggregates for various purposes, with mechanical properties thereof will now be set forth.

Example 12

A sand aggregate was produced from 1000 parts of conventional sand for building,
150 parts of a commercial aqueous solution of sodium silicate (36° Bé.)
22.5 parts of a 30 percent commercial neutral aqueous solution of glyoxal.

The aggregate had the following properties:

Resistance to crushing: (kg. per sq. cm.)
    After 48 hours _____ 21.2
    After 7 days _____ 39.0
    After 28 days _____ 47.6
Tensile strength:
    After 48 hours _____ 0.7
    After 7 days _____ 1.5
    After 28 days _____ 1.7

Example 13

1000 parts of china clay and 750 parts of a commercial aqueous solution of sodium silicate (36° Bé.) were mixed in a Werner mixer. With a view to obtaining a still flowing, thick paste, a small amount of water (50 parts) was incorporated; thereafter 75 parts of a 30 percent commercial neutral aqueous solution of glyoxal were added, mixing was proceeded with for a minute, then the mixture was cast into a mold.

A very quick setting took place; unmolding could be effected on the same day.

The aggregate thus obtained had the following properties:

Resistance to crushing: (kg. per sq. cm.)
   After 48 hours _____ 18.6
   After 7 days _____ 29.6
Tensile strength:
   After 48 hours _____ 0.6
   After 7 days _____ 1.6

*Example 14*

1000 parts of the chalk powder known as "Champagne white" were mixed in a Werner mixer with 100 parts of water and 500 parts of a commercial aqueous solution of sodium silicate (36° Bé.). After the mixture had become homogeneous, 50 parts of a 30 percent commercial aqueous solution of glyoxal were added thereto, and the pasty mixture was immediately cast into molds.

Setting took place after an hour; unmolding was effected on the same day.

The aggregate thus obtained had the following properties:

Resistance to crushing: (kg. per sq. cm.)
   After 48 hours _____ 47
   After 7 days _____ 48
Tensile strength:
   After 48 hours _____ 0.7
   After 7 days _____ 1.0

*Example 15*

To 1000 parts of powdered ferro-silicium, a liquid made from 120 parts of a commercial aqueous solution of sodium silicate (36° Bé.) and 12 parts of a 30 percent neutral aqueous solution of glyoxal was added. The whole was mixed up then poured into a mold and packed by vibrating. The aggregate could be unmolded on the same day. It was found to have the following properties:

Resistance to crushing: (kg. per sq. cm.)
   After 48 hours _____ 25.6
   After 7 days _____ 64.4
   After 28 days _____ 97.7

*Example 16*

1000 parts of zircon sand were placed in a flat trough where mixing was to be effected.

A mixture was prepared from 50 parts of a commercial aqueous solution of sodium silicate (36° Bé.) and 3.5 parts of a 30 percent neutral aqueous solution of glyoxal, and was poured on the zircon sand. The whole was made homogeneous by simultaneously shovelling and mixing. The material (I) thus obtained was cast into molds and packed. Unmolding could be effected on the same day.

Another material (II) was made up in the same way from 1000 parts of zircon sand,
75 parts of said sodium silicate solution,
7.5 parts of said glyoxal solution.

Freshly unmolded specimens of materials (I) and (II) were heated for an hour in an oven heated to 900° C.

The aggregates had the following mechanical properties:

|  | Aggr. I | Aggr. II | After 1 hour at 900° C | |
|---|---|---|---|---|
|  |  |  | Aggr. I | Aggr. II |
| Resistance to crushing (kg. per sq. cm.) after— |  |  |  |  |
| 48 hours | 14.8 | 21 | 304 | 1,240 |
| 7 days | 13.4 | 23 |  |  |
| 28 days | 36.2 | 41 |  |  |
| Tensile strength (kg. per sq. cm.) after 48 hours |  |  | 34 |  |

The table shows particularly high resistance to crushing after heat treatment in oven.

We have further found that in the production of a gel as above described solid blocks or shapes providing building materials of a new type are obtained if a homogeneous mixture of the reactants with a divided solid material such as sand, gravel, mud or silt, fibers, flakes and the like is formed.

Such building materials are desirable mainly because they enable the building of solid constructions very quickly from cheap homogeneous or heterogeneous materials as are abundantly available such as sand or earth. Parpens or panels of every description may also be made.

For making such building materials, we may simply mix up a divided solid material or materials such as sand, gravel, mud, or silt, earth or the like with an aqueous solution of alakali metal to which glyoxal has been added. After mixing, the mass sets quickly, within an hour, to a hard product which can be handled and shipped; further hardening may still continue beyond that period.

Setting may be hastened if it is so desired by elevating temperature. Thus for example with a mixture made up from 100 g. of an aqueous solution of sodium silicate having a strength of 35–37° Bé. and 6 g. of a neutral aqueous solution of glyoxal containing 300 g. of glyoxal per litre, the gelification period varies as follows with the temperature

| Temperature (degrees C.) | 10 | 15 | 20 | 25 | 30 | 40 | 50 |
|---|---|---|---|---|---|---|---|
| Gelification, hours | 2 | 1 |  |  |  |  |  |
| Period, min | 30 | 20 | 55 | 40 | 20 | 18 | 11 |

As above stated a commercial aqueous solution of sodium silicate, for example having a strength of 35–37° Bé., and commercial glyoxal as an aqueous solution thereof or in powder form may be employed. No additional water is required for effecting the process, a valuable advantage where water supply is scanty. However, additional water is not detrimental for obtaining the results above set forth and may even be resorted to in some cases.

A further advantage of the process is the extreme simplicity thereof whereby building materials may be made by unskilled men.

Furthermore, molded articles may be manufactured without employing mechanical compacting means acting by pressure, impact or vibration. However such means may be found useful in some particular instances.

In some cases, it may be desirable to provide a still harder surface; for that purpose a kind of varnish may be made from the ingredients herein mentioned plus, if need be, additional ingredients such as pigments of natural origin or the like, whereby smooth pleasant surfaces are obtained.

Thus, by mixing up 100 parts by weight of a commercial aqueous solution of sodium silicate (36° Bé.) and 20 parts by weight of a 30 percent commercial, neutral aqueous solution of glyoxal, there is obtained a homogeneous mixture which may be employed as such for coating materials of every description, including building materials as above described. It is also possible to mix up said solution with fillers such as kaolin or chalk (for example 50 parts by weight of filler per 100 parts by weight of silicate solution) and/or colored pigments capable of withstanding an alkaline medium such as ochres, red or brown iron oxides, dispersed organic dyestuffs and so on. After application in accordance with conventional methods, the coatings dry quickly, yielding colored or uncolored surface varnishes of a pleasant appearance and a great hardness.

In some cases it may be desirable to plasticize the materials or coatings produced according to this invention with a view to imparting them more flexibility. For that purpose, plasticizing ingredients such as rubber latex, neosorbitol and the like may be added thereto. For example during the manufacture of such materials or coatings, about 15 parts by weight of natural rubber latex (60 percent) per each 100 parts of silicate solution may be added; such a proportion may be increased or lessened according to the desired degree of plastification.

Furthermore, light porous, building materials may be obtained by adding frothing agents or a previously formed froth during the manufacture of the materials.

A few examples given below without any intention to limit the invention thereto, will illustrate the aspect of the invention which has been described above; the parts are parts by weight.

*Example 17*

1000 parts of fine sand (passing as an average through a screen having 38 meshes per inch) and 65 parts of a liquid made from 60 parts of a commercial aqueous solution of sodium silicate (36° Bé.) and 5 parts of a 30 percent commercial, neutral aqueous solution of glyoxal were mixed together. The mixture was made up for example in a concrete mixture.

Cast into molds, the mixture gave hard, tough blocks which could be handled and transported after about an hour so that after such a period then could already be employed as building materials. The blocks then became harder and reached their maximum degree of hardness after 24 to 48 hours.

The proportions of silicate and glyoxal with respect to fine sand may be varied within a wide range according to the desired mechanical properties.

In some cases it may be sufficient to add for example 35 parts of a commercial aqueous solution of sodium silicate (36° Bé.) and 2 parts of a 30 percent commercial neutral aqueous solution of glyoxal to 1000 parts of fine sand.

In other cases it may be desirable to employ higher proportions, for example, 90 parts of the same silicate solution and 11 parts of the same glyoxal solution with 1000 parts of fine sand.

The following table which is not limiting contains a few examples of proportions which may be employed according to the desired mechanical properties, the amount being parts by weight

|  | I | II | III | IV | V | VI |
|---|---|---|---|---|---|---|
| Sand | 1,000 | 1,000 | 1,000 | 1,000 | 1,000 | 1,000 |
| Sodium silicate solution (35-37°Bé.) | 50 | 75 | 100 | 35 | 60 | 90 |
| 30 percent glyoxal neutral solution | 3.3 | 6 | 13 | 2 | 5 | 11 |
| Corresponding, as reckoned on 100 parts of sodium silicate solution, (35-37° Bé.), to sand | 2,000 | 1,333 | 1,000 | 2,850 | 1,660 | 1,110 |
| 30 percent neutral glyoxal solution | 6.6 | 8 | 13 | 5.7 | 8.3 | 12.1 |

From a practical standpoint, everything takes place as for example in the case of concrete where it is a common practice to vary the proportion of cement over a range according to the desired mechanical properties.

*Example 18*

This example purports to illustrate the process employing divided materials of a heterogeneous character as are most frequently found in the nature. As an example a divided material having the following composition was taken 500 parts of coarse river sand,
350 parts of fine sand,
150 parts of silt (alluvial earth)

1,000 parts 1000 parts of the above divided material were mixed up with 81 parts of a liquid consisting of 75 parts of a commercial aqueous solution of sodium silicate (36° Bé.) and 6 parts of a 30 percent commercial neutral aqueous solution of glyoxal.

The mixture was made for example in a concrete mixer; poured into molds, it gave hard, tough blocks which could be handled and transported after about 1 hour so that after such a period, they could already be employed as building materials. The blocks then became harder and reached their maximum hardness after 24 to 48 hours.

The proportion of silicate and glyoxal with respect to the above divided material may be varied within a wide range according to the desired mechanical properties.

In some cases it may be sufficient to add for example 50 parts of a commercial aqueous solution of sodium silicate (36° Bé.) and 3.3 parts of a 30 percent commercial neutral aqueous solution of glyoxal to 1000 parts of the above divided material.

In other cases it may be desirable to employ higher proportions, for example 100 parts of the same silicate solution and 13 parts of the same glyoxal solution with 1000 parts of the above divided material.

It will be appreciated that the process described so far is useful where the siliceous hydrosol which after ½ to 1 hour sets to a gel is required to be stable for the relatively short period involved in preparatory works such as spraying, injecting, mixing and like works but thereafter to set quickly to a hard mass.

However, for other purposes, a much longer period of stability of the hydrosol is desirable.

In that connection it has often been attempted to employ silica sols for tanning purposes. As a matter of fact, silicic acid is known to precipitate gelatin from solutions thereof, forming a gelatin silicate which is water-insoluble and is not decomposed on being washed. As a theoretical result—and it was confirmed by experiments—silicic acid should be a valuable tanning agent.

However such a practical application has not been developed in view of the instability of silica hydrosols known heretofore; a silica hydrosol, even a purified one, obtained for example by hydrolyzing an alkali metal silicate and diallyzing the hydrolysis product, is too readily precipitable to be desirable in industrial fields such as that of tanning, for example.

If glyoxal is added to an aqueous solution of alkali metal silicate, the hydrosol thus produced is too much alkaline and unstable to be useful for tanning purposes. Acid hydrosols as are obtained by adding an acid to alkali metal silicate also have too short a life, which is shorter as the pH-value is higher; a high mineral acidity on the other hand is a drawback, which is frequently prohibitive for technical uses.

According to a further aspect of this invention, we have found that it is possible greatly to increase the period of life of acid sols of silica—even over a pH-range corresponding to weak acidity, for example 4 to 4.5—and to enhance the tanning capability of silicic acid, by adding glyoxal during the process for the production of such sols in aqueous medium. Silicic sols as obtained in the presence of glyoxal according to this invention not only produce reinforced tanning effects on gelatine (i.e. a compound having $NH_2$—, —NH— and other reactive groups) but are capable of producing analogous effects, practically similar to tanning effects, on natural or synthetic materials containing macromolecules which bear hydroxy groups. As chief effects, sensitiveness to water of polyvinyl alcohol articles is lowered, mechanical strength of papers in wet condition is increased, dimensional stability of cotton and regenerated cellulose fabrics is increased as well as the resistance thereof to abrasion, coatings on paper are fixed solidly and permanently.

Although our invention is not dependent upon any hypothesis or attempt of explanation it is supposed that glyoxal in an acid medium forms with silicic acid a water-soluble combination more stable than silicic acid, and such a combination reacts through the components thereof (silicic acid and glyoxal) with macromolecular substances containing $NH_2$—, $NH$— or other reactive groups, to yield more complex, water-insoluble compounds; an explanation would thus be found as to the results appearing from the examples given below and showing that in all cases, silicic acid and glyoxal hydrosols produce "tanning effects" much better and much more permanent than a hydrosol of silicic acid free from glyoxal, or a glyoxal solution free from silica.

Under this aspect thereof, our invention relates therefore to the production of hydrosols, preferably hydrosols having a relatively low content of silicic acid and glyoxal, in an acid medium, while under the first aspect thereof as above described, this invention relates to an intermediary production of highly concentrated siliceous hydrosols in an alkaline medium. According to the present aspect of this invention, silicic acid will subsequently react, together with glyoxal, with macromolecular compounds, while according to the first aspect of this invention, glyoxal acts on alkali from the silicate sol to produce, within the reaction medium, a very hard gel having highly desirable mechanical properties which can be practically taken advantage of.

In carrying our invention into effect, according to this aspect thereof, glyoxal and an aqueous solution of an acid such as hydrochloric acid may be mixed together, in particular glyoxal may be added to such a solution, then an aqueous solution of an alkali metal silicate may be introduced into the glyoxal acid aqueous solution. A silicic acid sol noticeable by the great stability and the valuable "tanning" properties thereof is thus obtained.

The silicate solution may also be introduced into the acid solution, and glyoxal added separately shortly thereafter.

As an alkali silicate solution, a commercial aqueous solution of sodium silicate such as the solution having a strength of 35–37° Bé. for example may be employed. As an acid, sulphuric acid or hydrochloric acid, for example, may be employed, hydrochloric acid being generally preferred.

The proportions and concentrations of alkali metal silicate, acid and glycoxal to be employed may vary within wide ranges. According to the future use of the hydrosol, a $SiO_2$ concentration of from 3 to 15 percent for example will be selected. As to the proportion and dilution of acid, it is generally desirable to choose the same in order that the pH-value of the hydrosol is of the order of 4–4.5 because that pH-range is generally preferred for subsequent applications, although a lower pH-value may also be employed, the process being operative with any pH-value which is chemically suitable for the production of a silica gel. Finally the proportion of glyoxal to be employed will depend on the desired degree of stability or capability of keeping for the hydrosol, as well as the tanning potency to be secured. Generally speaking amounts of from 5 to 150 g. of glyoxal (reckoned as pure or 100 percent glyoxal) per litre of hydrosol are preferred. Glyoxal may be employed, for example, as a commercial aqueous solution thereof, or powdered polyglyoxal or crystalline glyoxal hydrate.

In some cases, it may be desirable to add various ingredients to hydrosols prepared according to this aspect of our invention, with a view to obtaining special effects on the material to be tanned, for example:

Glycerol, neosorbital for more flexibility,
Polyvinyl acetate emulsions for greater strength,
Dextrins, sugars, water-soluble cellulosic derivatives for more stiffness (i.e. better "feel" in fabrics for example)

and so on.

The following examples which are not limiting, will illustrate the last described aspect of our invention; the parts are parts by weight.

*Example 19*

To 65 litres of 10 N hydrochloric acid, 50 kg. of a 30 percent commercial aqueous solution of glyoxal were added then the mixture was diluted with water to a total volume of 1000 litres. To the solution thus obtained, 500 litres of a solution containing 250 kg. of a commercial aqueous solution of sodium silicate (35–37° Bé.) diluted with water were added at one go.

The hydrosol thus obtained contained 40 g. of $SiO_2$ and 10 g. of glyoxal (100 per cent) per litre; the pH thereof was between 4 and 4.5; it was stable for 17 hours at ordinary temperature while in the absence of glyoxal, under the same conditions, the corresponding hydrosol was stable only for 3 hours.

The proportion of glyoxal may be varied. In the foregoing example, instead of 50 kg. of a 30 percent glyoxal solution as stated, for example 25 to 400 kg. of the same glyoxal solution—it being understood that the indicated figures are not to be considered as lower and upper limits—could be employed, leading to hydrosols containing for example 40 g. of $SiO_2$ and 5 to 80 g. of glyoxal (100 percent) per litre.

We have found that the period of stability for such hydrosols is longer as the proportion of added glyoxal is higher:

HYDROSOL COMPOSITION (GRAMS PER LITRE)

| $SiO_2$ | Glyoxal | pH | Stability period |
|---|---|---|---|
| 40 | 0 | 4–4.5 | 3 hours. |
| 40 | 5 | 4–4.5 | 12 hours. |
| 40 | 10 | 4–4.5 | 17 hours. |
| 40 | 20 | 4–4.5 | 2 days. |
| 40 | 40 | 4–4.5 | 5 days. |
| 40 | 60 | 4–4.5 | 8 days. |
| 40 | 80 | 4–4.5 | 12 days. |

*Example 20*

To 65 litres of 10 N hydrochloric acid, 50 kg. of a 30 percent commercial aqueous solution of glyoxal were added, then the mixture was diluted with water to a total volume of 500 litres. Into the solution thus produced, 500 litres of a solution prepared from 250 kg. of a commercial aqueous solution of sodium silicate (35–37° Bé.) by diluting the same with water were poured abruptly, at one go.

The hydrosol thus obtained contained 60 g. $SiO_2$ and 15 g. of glyoxal (100 percent) per litre; it had a pH-value between 4 and 4.5; it was stable for 24 hours at ordinary temperature, while a hydrosol produced under the same conditions but without glyoxal was stable only for one hour.

If, instead of 50 kg., 33.3 kg. of the same glyoxal solution were employed, the corresponding hydrosol containing 60 g. of $SiO_2$ and 10 g. of glyoxal per litre was stable for 15 hours instead of 24 hours.

*Example 21*

To 173.5 litres of 10 N hydrochloric acid, 133 kg. of a 30 percent commercial aqueous solution of glyoxal were added, then the whole was diluted with water to a total volume of 1000 litres. Into the solution thus produced, 1000 litres of a solution prepared from 667 kg. of a commercial aqueous solution of sodium silicate (35–37°) by diluting the same with water were poured abruptly, at one go.

The hydrosol thus obtained contained 80 g. of $SiO_2$ and 20 g. of glyoxal per litre; it had a pH-value between 4 and 4.5; it was stable for 24 hours at ordinary temperature while a hydrosol prepared under the same conditions but without glyoxal was stable only for 1 hour.

If instead of 133 kg., 66.6 kg. of the same glyoxal solution were employed, the corresponding hydrosol containing 80 g. of SiO₂ and 10 g. of glyoxal per litre was stable for 16 hours instead of 24 hours.

*Example 22*

To 300 litres of 2 N hydrochloric acid, 200 litres of an aqueous solution of glyoxal containing 300 g. of glyoxal per litre were added. Into the solution thus obtained, 500 litres of an aqueous solution containing 250 kg. of a commercial aqueous solution of sodium silicate (35–37° C.) were poured abruptly, at one go.

The hydrosol thus obtained contained 60 g. of $SiO_2$ and 60 g. of glyoxal per litre; it was stable for 3 days at ordinary temperature, while a hydrosol prepared under the same conditions but without glyoxal was stable only for 1 hour.

*Example 23*

In the foregoing Examples 19–22, hydrochloric acid may be replaced by equivalent stoichiometric proportions of sulphuric acid. For example 32 kg. of white sulphuric acid having a strength of 66° Bé. could be substituted for the 65 litres of 10 N hydrochloric acid mentioned in Examples 19 and 20.

As in the case of hydrochloric acid, a considerable stabilizing effect was obtained, but in absolute value the effect obtained with sulphuric acid was generally below that obtained with hydrochloric acid. Thus for example a hydrosol containing 40 g. of $SiO_2$ and 60 g. of glyoxal per litre was stable for 2½ days when prepared with sulphuric acid while it was stable for 8 days when prepared with hydrochloric acid.

*Example 24*

This example purports to show the desirability of the process according to this invention in tanning gelatin.

Sheets of pure gelatin ("Crenitine" sold by Prolabo) were immersed in hydrosols prepared according to this invention for periods of one hour and 24 hours. The sheets were then allowedf to dry at ambient temperature for 48 hours, then weighed and immersed in distilled water for 1 hour, 4 hours and 24 hours. They were finally drained between two sheets of filter paper then weighed again to determine the amount of water absorbed. The water absorption represented the "swelling" of gelatin and was expressed as percentage of the initial weight of gelatin sheets.

A few results are tabulated below:

| Hydrosol composition (grams per litre) | | Swelling (percent) | | | | | |
|---|---|---|---|---|---|---|---|
| | | Immersed for 1 hour in hydrosol—Immersed in water for— | | | Immersed for 24 hours in hydrosol—Immersed in water for— | | |
| SiO₂ | Glyoxal | 1 h. | 4 h. | 24 h. | 1 h. | 4 h. | 24 h. |
| 40 | 0 | Disp. | Disp. | Disp. | ------ | ------ | ------ |
| 40 | 5 | Disp. | Disp. | Disp. | ------ | ------ | ------ |
| 40 | 10 | Disp. | Disp. | Disp. | ------ | ------ | ------ |
| 40 | 20 | 450 | 680 | 800 | 320 | 410 | 480 |
| 40 | 40 | 340 | 470 | 600 | 290 | 320 | 380 |
| Controls | | | | | | | |
| 0 | 20 | 700 | Disp. | Disp. | 350 | 490 | Disp. |
| 0 | 40 | 500 | 700 | Disp. | 300 | 340 | 400 |
| 0 | 0 | Disp. | Disp. | Disp. | ------ | ------ | ------ |

It will thus be appreciated from the table that when a gelatin sheet is contacted for 1 hour with a hydrosol containing 40 g. of $SiO_2$ per litre but no glyoxal, the sheet will be completely loosened after being subsequently immersed in water for 1 hour. On the contrary, an identical gelatin sheet, treated under the same conditions but in the presence of glyoxal is capable of withstanding subsequent immersions in water: after 24 hours in water where 40 g. of glyoxal (100%) per litre had been employed, the gelatin sheet was not loosened; the swelling thereof amounted to 600 percent.

In the case of a more severe treatment, specifically for 24 hours instead of 1 hour, with the above hydrosol, the other conditions being the same, the degree of swelling of the gelatin sheet, after 24 hours in water, was only 380% instead of 600%.

It is pointed out that with glyoxal alone, in the absence of $SiO_2$, good effects of resistance to water may already be obtained (see the above table).

*Example 25*

This example purports to show the desirability of the process according to this invention for rendering polyvinyl alcohol sheets insoluble in water.

"Rhodoviol" (polyvinyl alcohol) sheets as sold by the firm Rhone-Poulenc, of three different thicknesses, 0.08 mm., 0.25 mm., 0.40 mm., were employed.

The "Rhodoviol" sheets were immersed for either 1 hour or 24 hours in hydrosols prepared according to this invention. Thereafter the sheets were dried at ambient temperature for 48 hours then weighed and immersed in distilled water for 1, 4 and 24 hours; they were finally drained between two sheets of filter paper then weighed again to determine the amount of water absorbed. The water absorption represented the "swelling" of the polyvinyl alcohol sheet; it was expressed as percentage of the initial weight of the "Rhodoviol" sheet.

The results with "Rhodoviol" sheets having a thickness of 0.08 mm. were as follows:

| Hydrosol composition (grams per litre) | | Swelling (percent) | | | | | |
|---|---|---|---|---|---|---|---|
| | | Immersed for 1 hour in hydrosol—Immersed in water for— | | | Immersed for 24 hours in hydrosol—Immersed in water for— | | |
| SiO₂ | Glyoxal | 1 h. | 4 h. | 24 h. | 1 h. | 4 h. | 24 h. |
| 40 | 0 | 90 | 110 | 170 | ------ | ------ | ------ |
| 40 | 5 | 60 | 110 | 150 | ------ | ------ | ------ |
| 40 | 10 | 55 | 110 | 150 | ------ | ------ | ------ |
| 40 | 20 | 50 | 95 | 140 | 70 | 110 | 130 |
| 40 | 40 | 10 | 50 | 50 | 10 | 30 | 50 |
| Controls | | | | | | | |
| 0 | 0 | 650 | Disp. | Disp. | ------ | ------ | ------ |
| 0 | 5 | 500 | Disp. | Disp. | ------ | ------ | ------ |
| 0 | 10 | 350 | 600 | Disp. | ------ | ------ | ------ |
| 0 | 20 | 300 | 480 | Disp. | 100 | 150 | 230 |
| 0 | 40 | 30 | 90 | 150 | 20 | 30 | 90 |

From the foregoing table, it will be appreciated that (a) An untreated (0–0) polyvinyl alcohol sheet (0.08 mm.) swells by 650 percent if it is immersed for an hour in water (it is completely loosened after a few hours);

(b) A polyvinyl alcohol sheet (0.08 mm.) treated for 1 hour with a hydrosol containing 40 g. of $SiO_2$ per litre, without glyoxal (40–0), swells by 90 percent after 1 hour's immersion in water;

(c) An identical polyvinyl alcohol sheet treated under the same conditions but in the presence of 40 g. of glyoxal per litre swells only by 10% after 1 hour's immersion in water.

We have further found that polyvinyl alcohol sheets having thicknesses of 0.25 mm. and 0.40 mm. behave similarly but swellings are a little greater as thickness increases, all other things being the same.

*Example 26*

This example purports to show the desirability of the process according to this invention in the manufacture of paper.

Kraft paper of usual grade was employed.

Strips thereof were immersed for 15 minutes in hydrosols prepared according to this invention. They were then squeezed between rubber rollers to leave about 1 part by weight of hydrosol in the paper, per each part by weight of said paper. Thereafter the strips were left in air for 48 hours for drying then cut to test specimens which were subjected to break tests in dry condition and in wet condition.

So far as tests in wet condition were concerned, three measurements were made in all cases, viz:

(a) After 1 minute's immersion in water;
(b) After 1 hour's immersion in water;
(c) After 20 hours' immersion in water.

The force (in grams) causing breaking of a specimen of given dimensions which were rigorously the same for all specimens, was measured.

A number of results are tabulated below:

| Composition of hydrosol (grams/litre) | | Breaking stress (R) | | | |
|---|---|---|---|---|---|
| | | Treated dry paper | Wet paper | | |
| SiO₂ | Glyoxal | | R after 1 minute's immersion | R after 1 hour's immersion | R after 20 hour's immersion |
| 40 | 0 | 1,800 | 820 | 650 | 520 |
| 40 | 5 | 1,870 | 1,230 | 770 | 770 |
| 40 | 10 | 1,770 | 1,200 | 800 | 783 |
| 40 | 20 | 1,730 | 1,200 | 833 | 517 |
| 40 | 40 | 2,000 | 1,250 | 1,070 | ---- |
| 60 | 0 | 2,000 | 650 | 700 | 400 |
| 60 | 10 | ----- | 1,350 | 1,000 | 800 |
| 60 | 15 | 2,100 | 1,500 | 1,100 | 850 |
| 80 | 0 | 1,900 | 700 | 600 | 400 |
| 80 | 10 | 2,300 | 1,200 | 750 | 625 |
| 80 | 20 | ----- | 1,450 | 1,050 | 700 |
| 0 | 0 | 1,900 | 200 | 0 | 0 |
| 0 | 5 | 1,750 | 750 | 570 | 217 |
| 0 | 10 | 1,700 | 900 | 683 | 333 |
| 0 | 20 | 1,700 | 970 | 720 | 370 |
| 0 | 40 | 1,730 | 983 | 783 | 383 |

From the above table, it will be appreciated, in particular, that (a) Untreated paper (0–0) shows a resistance to breaking of 800 after 1 minute's immersion in water (after 1 hour, it has no longer any resistance at all);

(b) A paper treated with a silica hydrosol in the absence of glyoxal is much less resistant to breaking in wet condition than if it has been treated in the presence of glyoxal.

The treatment by means of hydrosols produced in accordance with this invention imparts to papers a high resistance to water. Even after they have been immersed for a couple of weeks in water, papers treated according to this invention, for example with a solution containing 60 g. of SiO₂ and 15 g. of glyoxal per litre, were found still to have surprising properties of mechanical strength.

*Example 27*

This example purports to show the desirability of the process according to this invention for obtaining a permanent, solid fixing of surface coatings, particularly in the manufacture of washable wall papers.

An ordinary, non-washable wall paper was impregnated with a hydrosol prepared according to this invention and containing 60 g. of SiO₂ and 60 g. of glyoxal per litre (see Example 21).

A washable wall paper showing a very high degree of washability after testing with a so-called "plynomater" (more than 100 sponge strokes) and very good resistance to water penetration was thus obtained.

A "plynomater" is a measurement apparatus recording the number of strokes which can be given with a wet sponge on a coating (say a paint coating) without detriment to the surface of said coating.

*Example 28*

Reference was made above to incorporating additional ingredients in hydrosols according to this invention with a view to obtaining special effect.

The preferred amounts to be added to 100 parts of hydrosol are as follows:

Polyvinyl acetate emulsions: 5 to 10 parts (dry material);
Glycerol or neosorbitol: 1 to 2 parts;
Dextrin: 5 to 10 parts;
Methyl cellulose (e.g. Blanose MT 100): 1 to 2 parts;
Hydroxyl-ethyl cellulose (e.g. Modocoll 600 or 400): 0.5 to 1 part.

*Example 29*

This example purports to show the desirability of the process according to this invention for stabilizing fabric dimensions.

A viscose rayon crepe de Chine, weighing 100 g. per sq. m. was impregnated with a hydrosol prepared as above described and containing 60 g. of SiO₂ and 15 g. of glyoxal (100%) per litre.

After having been immersed for 15 minutes, the fabric was squeezed between rubber rollers then dried at ambient temperature, under a slight tension, so as to preserve initial dimensions through the drying process.

The weight of the fabric after that treatment, the swelling degree (weight of absorbed water per 100 g. of fabric) and the dimensional shrinkage (warp and weft) after treatment for half an hour in water at 50° C. containing 5 g. of Marseille soap per litre were measured.

The results comparatively to a control, untreated fabric are tabulated below:

| | Control | Treated |
|---|---|---|
| Weight, g. per sq. m | 100 | 132 |
| Swelling, percent | 55 | 24 |
| Warp shrinkage, percent | 13.5 | 7 |
| Weft shrinkage, percent | 3.5 | 3.5 |

A considerable, permanent matting effect was further noticed on the treated fabric.

While the foregoing examples illustrate the use of sodium silicate because commercial aqueous solutions thereof are commonly available potassium silicate may in all cases be substituted therefor and was actually found to lead to the same results; for example where a commercial aqueous solution of sodium silicate having a strength of 36° Bé. is referred to, 100 parts by weight thereof may be replaced by 136 parts by weight of a commercial aqueous solution of potassium silicate having a strength of 31° Bé.

In all examples relating to a 30 percent aqueous solution of glyoxal, 100 parts by weight thereof may be replaced, for example by 38.4 parts by weight of 78 percent, powdery polyglyoxal or 36.6 parts by weight of 82 percent powdered crystalline glyoxal; a mere stirring is enough to cause dissolution of such solid forms of glyoxal.

What we claim is:

1. The process of production of a silica-containing hydrosol from sodium silicate in an aqueous medium, comprising the step of mixing together glyoxal and a sodium silicate aqueous solution at a temperature of from 10 to 30° C., said glyoxal being employed in an amount of from 1.7 to 48 parts by weight reckoned as 100 percent glyoxal, in the form of a water-containing glyoxal which has a 100 percent glyoxal content of from 30 to 82 percent by weight, while said sodium silicate aqueous solution is employed in an amount of 100 parts by weight, has a strength of from 35 to 50° Bé. and contains SiO₂ and Na₂O in a molecular proportion of 3:1 to 4:1.

2. The process of claim 1, wherein said sodium silicate aqueous solution contains additional water in an amount corresponding to no more than 100 percent by weight as reckoned on a 36° Bé. aqueous sodium silicate solution.

3. The process of claim 1, wherein said glyoxal is in the form of a substantially neutralized aqueous solution of commercial glyoxal having said 100 percent glyoxal content, whereby the hydrosol initially produced is capable of developing a hardenable gel.

4. The process of claim 1, wherein a mineral acid and additional water are also mixed together with said glyoxal and said sodium silicate solution in such an amount as to secure for the mixture thus produced a $SiO_2$ content of from 3 to 15 percent by weight, a pure glyoxal content of from 5 to 150 g. per litre, said mixture being weakly acid and having a pH of at least 4.

5. The process of claim 4, wherein said step is effected by introducing said sodium silicate aqueous solution into a mixture of an aqueous solution of a mineral acid with said water-containing glyoxal.

6. The process of claim 4, wherein the amount of mineral acid is such as to secure for said mixture a pH of from 4 to 4.5.

7. A hydrosol which contains by weight from 3 to 25 percent of $SiO_2$, from 1 to 7.5 percent of $Na_2O$ and from 0.4 to 7.3 percent of CHO—CHO, the remainder substantially consisting of water.

8. A hydrosol which contains by weight from 3 to 25 percent of $SiO_2$, from 1 to 7.5 percent of $Na_2O$ and from 0.4 to 7.3 percent of CHO—CHO, the remainder substantially consisting of water together with so much of a mineral acid that the hydrosol has a pH in the range of 4–4.5.

References Cited in the file of this patent

UNITED STATES PATENTS

| | | |
|---|---|---|
| 1,263,297 | Vargyas | Apr. 16, 1918 |
| 1,479,472 | Long | Jan. 1, 1924 |
| 1,719,914 | Tuttle | July 9, 1929 |
| 1,935,769 | Charles | Nov. 21, 1933 |
| 2,162,387 | Radabaugh | June 13, 1939 |
| 2,276,314 | Kirk | Mar. 17, 1942 |
| 2,383,653 | Kirk | Aug. 28, 1945 |
| 2,414,858 | Davidson | Jan. 28, 1947 |
| 2,601,291 | Horning | June 24, 1952 |
| 2,708,186 | Kimberlin et al. | May 10, 1955 |